(12) United States Patent
Yano

(10) Patent No.: US 7,414,745 B2
(45) Date of Patent: Aug. 19, 2008

(54) IMAGE READING SYSTEM AND IMAGE READING METHOD

(75) Inventor: Toshiyuki Yano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1076 days.

(21) Appl. No.: 10/647,451

(22) Filed: Aug. 26, 2003

(65) Prior Publication Data

US 2004/0109194 A1 Jun. 10, 2004

(30) Foreign Application Priority Data

Aug. 28, 2002 (JP) ............................. 2002-248784

(51) Int. Cl.
*G06F 15/00* (2006.01)
*H04N 1/00* (2006.01)
*H04N 1/04* (2006.01)

(52) U.S. Cl. ................ 358/1.14; 358/1.18; 358/426.02; 358/437; 358/474

(58) Field of Classification Search ................ 358/1.14, 358/1.18, 1.16, 426.02, 437, 453, 474
See application file for complete search history.

(56) References Cited

U.S. PATENT DOCUMENTS

| | | | | |
|---|---|---|---|---|
| 5,055,935 A * | 10/1991 | Ohno | ........................... | 358/296 |
| 6,038,040 A * | 3/2000 | Nishimura et al. | ........... | 358/468 |
| 7,048,194 B2 * | 5/2006 | Minami et al. | ............... | 235/492 |
| 7,081,965 B2 * | 7/2006 | Taniguchi | ................... | 358/1.15 |
| 7,170,632 B1 | 1/2007 | Kinjo | | |
| 2002/0051161 A1 * | 5/2002 | Kanazawa et al. | ......... | 358/1.12 |
| 2005/0141003 A1 * | 6/2005 | Yamamoto et al. | ......... | 358/1.12 |
| 2005/0141004 A1 * | 6/2005 | Kiwada | ...................... | 358/1.12 |
| 2005/0141009 A1 * | 6/2005 | Kiwada | ...................... | 358/1.14 |

FOREIGN PATENT DOCUMENTS

| | | |
|---|---|---|
| JP | A-11-187247 | 7/1999 |
| JP | A-2000-66312 | 3/2000 |
| JP | A-2000-285203 | 10/2000 |
| JP | A 2000-285203 | 10/2000 |
| JP | A 2001-283011 | 10/2000 |
| JP | A 2001-134672 | 5/2001 |
| JP | A 2001-148000 | 5/2001 |
| JP | A 2001-229199 | 8/2001 |
| JP | A 2001-260580 | 9/2001 |

OTHER PUBLICATIONS http://pcweb.mycom.co.jp/news/2001/07/05/22.html.

* cited by examiner

*Primary Examiner*—Mark Zimmerman
*Assistant Examiner*—Mesfin Getaneh
(74) *Attorney, Agent, or Firm*—Oliff & Berridge, PLC

(57) ABSTRACT

A copying apparatus detects as to whether or not an IC chip is present in an original paper. When the IC chip is detected, the copying apparatus reads data from this IC chip. When the read data is additional information, which can be printed as an image, the copying apparatus stops a printing process, and notifies a message indicating that the read data is the additional information to the user and then, waits for an instruction issued by the user. When the user instructs to print the additional information, the copying apparatus prints the image read from the original paper and the additional information read from the IC chip on a printing paper in an output format designated by the user.

12 Claims, 12 Drawing Sheets

| ADDITIONAL INFORMATION A (IMAGE) |
| ADDITIONAL INFORMATION B (TEXT) |
| ADDITIONAL INFORMATION C (VOICE) |

IC CHIP 3-A
(STORING MENU OF RESTAURANT)

MAP IMAGE

IC CHIP 3-B
(STORING FARE TABLE OF HIGHWAY)

IMAGE READING SYSTEM AND IMAGE READING METHOD

The present disclosure relates to the subject matter contained in Japanese Patent Application No. 2002-248784 filed on Aug. 28, 2002, which is incorporated herein by reference in its entirety.

BACKGROUND OF THE INVENTION

1. Field of the Invention

The present invention relates to an image reading system and an image reading method, which detects as to whether or not a non-contact memory attached to an original is present and performs a process responding to the detection result.

2. Description of the Related Art

A compact semiconductor chip (for example, μ-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

SUMMARY OF THE INVENTION

The present invention has been made from the viewpoint of the technical background, and has an object to provide an image reading system and an image reading method, which detects as to whether or not a semiconductor chip storing additional information is present and making a user recognize the presence of the semiconductor chip when the semiconductor chip is detected.

[Image Reading System]

To achieve the above-described object, according to a first aspect of the invention, a image reading system includes an image display member on which an image is displayed, and an image reading apparatus. The image display member includes a data supply device for storing a predetermined data and supplying the stored predetermined data to an external device. The image reading apparatus includes an image reading unit for reading the displayed image, a data reading unit for reading the supplied predetermined data from the image display member, an output unit for outputting at least one of the read image and the read predetermined data, and a control unit for controlling at least one of the image reading unit and the output unit in response to whether or not the supplied predetermined data has been read.

Preferably, when the predetermined data has been read, the control unit controls the output unit to output at least one of the read image and the read predetermined data in response to the read predetermined data. When the predetermined data has not been read, the control unit controls the output unit to output the read image.

Preferably, the control unit judges an attribute of the read predetermined data on the basis of attribute data contained in the read predetermined data. The control unit controls at least one of the image reading unit and the output unit in response to whether or not the judged attribute is an attribute indicating data, which is printable as an image.

Preferably, the image reading apparatus further includes an operation unit for promoting a user to select at least one of the read image and the read predetermined data as output data to be output, when the judged attribute is the attribute indicating the printable data as an image. When the judged attribute is the attribute, which is printable as an image, the control unit controls the image reading unit to stop reading the displayed image Preferably, the operation unit receives an operation for selecting the output data. When the output data is selected, the control unit controls the image reading unit to restart reading the displayed image and controls the output unit to output the selected output data.

Preferably, the operation unit further receives another operation for designating an output format at a time of outputting the output data. The control unit controls the output unit to output the selected output data in the designated output format.

Preferably, when the read image and the read predetermined data are selected as the output data, the control unit controls the output unit to print the read image and the read data on different image formation media in accordance with the designated output format, respectively.

Preferably, when the read image and the read predetermined data are selected as the output data, the control unit controls the output unit to print the read image and the read predetermined data on both surfaces of an image formation medium in accordance with the designated output format, respectively.

Preferably, the image reading apparatus further includes a synthesizing unit for synthesizing the read image with the read predetermined data in accordance with the designated output format. When the read image and the read predetermined data are selected as the output data, the control unit controls the output unit to output the synthesized data in accordance with the designated output format.

Preferably, the synthesizing unit synthesizes the read image with the read predetermined data in accordance with the designated output format so that the read image and an image indicated by the read predetermined image are displayed in a superimposed manner.

Alternatively, the synthesizing unit may synthesize the read image with the read predetermined data in accordance with the designated output format so that the read image and an image indicated by the read predetermined image are displayed side by side.

[Image Reading Appaatus]

Also, an image reading apparatus according to a second aspect of the invention is any one of the above-described image reading apparatus of the image reading system.

[Image Reading Method]

Also, according to a third aspect of the invention, an image reading method includes reading a predetermined data stored in an image display member, controlling at least one of a process for reading an image displayed on the image display member and a process for outputting the read image in response to whether or not the supplied predetermined data has been read, performing the process for reading the image displayed on the image display member in accordance with the control, and outputting at least one of the read image and the read predetermined data in accordance with the control.

[Program]

Further, according to a fourth aspect of the invention, a program making a computer conduct a process includes reading a predetermined data stored in an image display member, controlling at least one of a process for reading an image displayed on the image display member and a process for outputting the read image in response to whether or not the supplied predetermined data has been read, performing the process for reading the image displayed on the image display member in accordance with the control, and outputting at least one of the read image and the read predetermined data in accordance with the control.

BRIEF DESCRIPTION OF THE PREFERRED EMBODIMENT

DETAILED DESCRIPTION OF THE PREFERRED EMBODIMENTS

Figure 1:
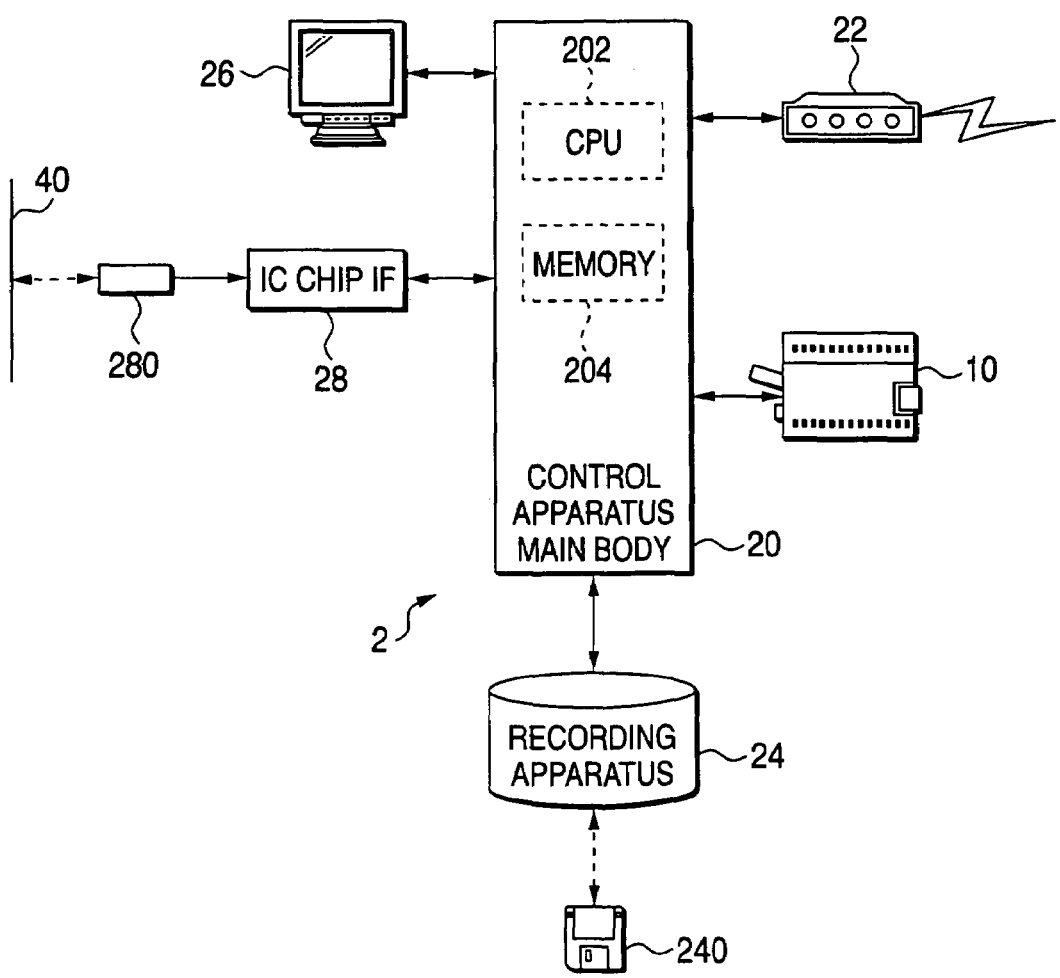
FIG. 1 is a diagram for representing a hardware structure of a copying apparatus to which an image reading method according to the present invention is applied, i.e., for mainly exemplifying a control apparatus thereof.

FIG. 1 is a diagram for showing a hardware structure of a copying apparatus 1 to which an image reading method of the invention is applied, while mainly showing an example of a control apparatus 2 thereof.

As shown in FIG. 1, the copying apparatus 1 includes the control apparatus 2 and a copying apparatus main body 10.

The control apparatus 2 includes a control apparatus main body 20, a communication apparatus 22, a recording apparatus 24 such as an HDD/FDD/CD apparatus, a user interface apparatus (UI apparatus) 26, and an IC chip interface (IC chip IF) 28. The control apparatus main body 20 contains a CPU 202, a memory 204, and the like. The user interface apparatus 26 contains either an LCD display apparatus or a CRT display apparatus, and a keyboard/touch panel, and so on. The IC chip interface 28 contains an antenna 280.

Figure 2A:
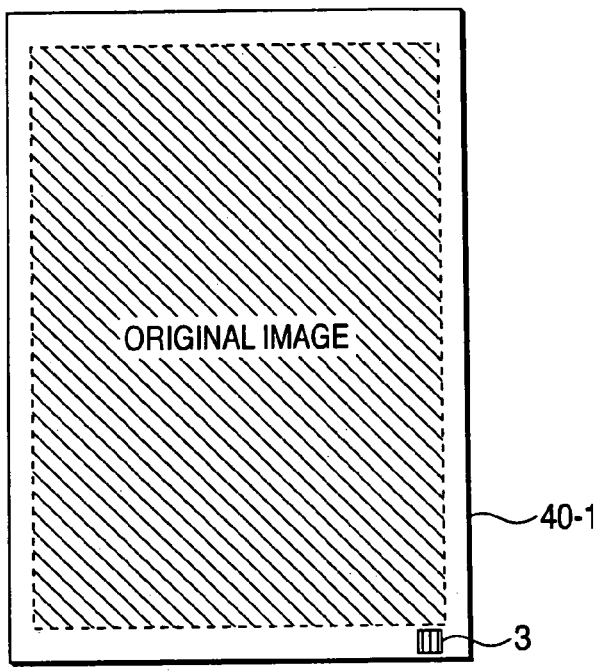
FIG. 2A is a diagram for showing a first original paper in an exemplification manner, which is employed as an original in the image reading method according to the present invention.
Figure 2B:
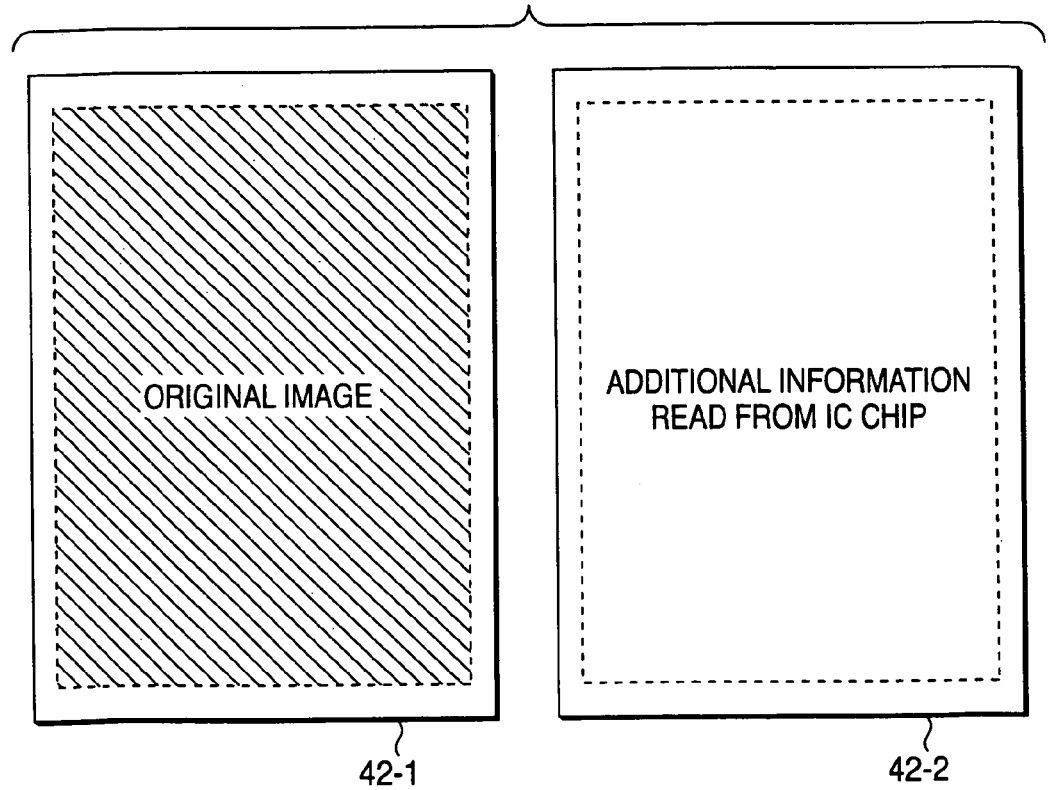
FIG. 2B is a diagram for representing a printing paper in an exemplification manner, which is printed based upon the first original paper shown in FIG. 2A.

FIG. 2A shows an example of a first original paper 40-1 (first image display apparatus), which is used as an original in the image reading method according to the invention. FIG. 2B shows an example of a printing paper 42 (image forming medium), which is printed based upon the first original paper 40-1 shown in FIG. 2A.

Figure 3:
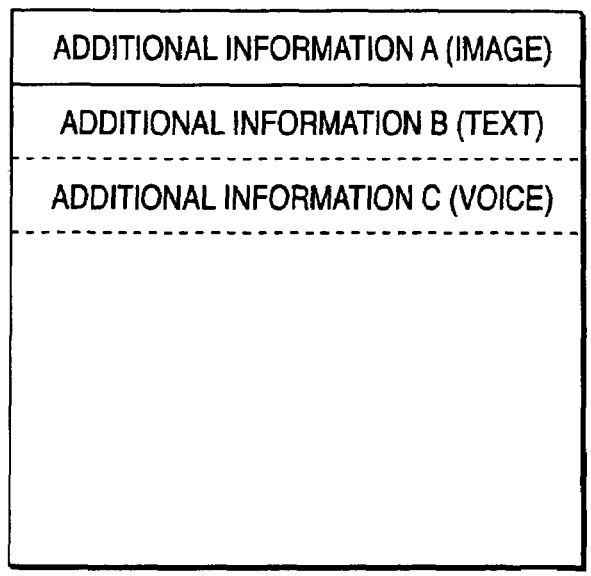
FIG. 3 is a diagram for exemplifying data which is stored into the IC chip shown in FIG. 2A.

FIG. 3 is a diagram for showing an example of data, which is stored in the IC chip 3 (data supply device) shown in FIG. 2A.

It should be noted that the original paper 40 is classified into two original papers, namely, a first original paper 40-1 (first image display member) to which the IC chip 3 has been attached, and a second original paper 40-2 (second image display member) to which the IC chip 3 has not been attached.

As shown in FIG. 2A, an image (will be referred to as "original image" hereinafter), which is to be read by the copying apparatus 1 (FIG. 1), is displayed on the first original paper 40-1.

Also, the IC chip 3 is attached to this first original paper 40-1.

This IC chip 3 is a semiconductor chip from which data stored thereinto can be read in a non-contact manner. As shown in FIG. 3, the IC chip 3 stores thereinto image data (additional information "A"), text data (additional information "B"), voice data (additional information "C"), and the like.

These additional information relates to, for instance, the original image displayed on the first original paper 40, and has a purpose to supply additional information to a user.

Also, additional information stored in the IC chip 3 contains attribute data, which indicates an attribute (image data, text data, or voice data) of this data.

The attribute data includes an extension (such as ".txt" or ".html"), which is attached to a data file name of the additional information.

When the original paper 40-1 shown in FIG. 2 is set at an image reading position and a commencement of a copying process operation is instructed, the copying apparatus (FIG. 1) controls the IC chip IF 28 (FIG. 1) to try to read the additional information from the IC chip 3 attached to the original paper 40-1.

When the additional information is read from the IC chip 3, the copying apparatus 1 judges an attribute of the read data based upon the attribute data contained in the additional information read from the IC chip 3.

When the copying apparatus judges that the attribute of the read additional information corresponds to a printable attribute, the copying apparatus 1 interrupts the copying process operation, notifies a fact that printable additional information is present to a user, and then waits for an instruction by the user.

On the other hand, in other cases than the above-described case, the copying apparatus 1 executes the normal copying process operation.

When the user instructs the copying apparatus 1 to print the additional information, the copying apparatus 1 (FIG. 1) prints the original image read from the original paper 40-1 and the additional information read from the IC chip 3 on the printing paper 42-1 and the printing paper 42-2, respectively, in a separation manner as shown in FIG. 2B.

It should also be noted that in response to an instruction issued from a user, the copying apparatus 1 can execute printing operations in a plurality of output formats such as a double-plane printing format and a synthesizing print format (will be explained with reference to FIGS. 13 and 14) in addition to the output format shown in FIG. 2B.

EXAMPLE

An example of an image processing method according to the invention will now be described in detail by exemplifying a specific example.

Figure 4:
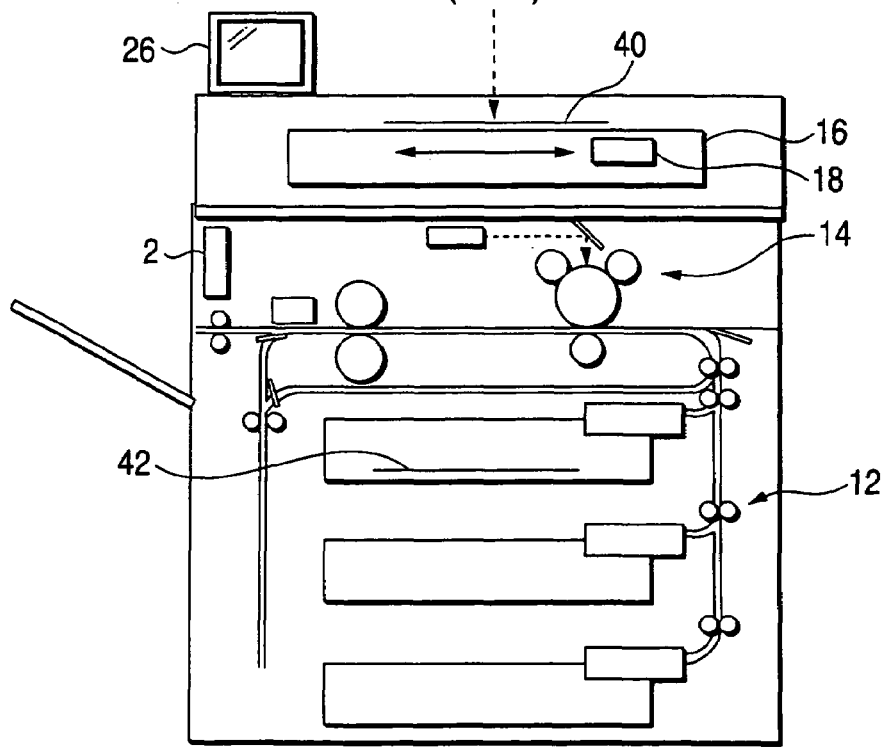
FIG. 4 is a diagram for exemplifying a hardware construction of a copying apparatus main body indicated in FIG. 1.

FIG. 4 is a diagram for showing an example of a hardware structure of the copying apparatus main body 10 shown in FIG. 1.

As shown in FIG. 4, the copying apparatus main body 10 includes a paper tray section 12, a print engine 14, a scanner 16, and the like. The print engine 14 prints an image on the printing paper 42 by way of the xerography technique and the like.

The scanner 16 includes a scanner head 18 for reading an original image of the original paper 40.

While the scanner head 18 is moved along a narrow direction, the scanner 16 reads the original image from the original paper 40, which is put on a transparent plate provided at an upper surface of the scanner 16.

Also, the UI (user interface) apparatus 26 is arranged at an upper portion of the copying apparatus main body 10.

It should be noted that as shown in FIG. 4, the control apparatus 2 (see FIG. 1) is actually contained inside the copying apparatus main body 10.

[Scanner 16/Scanner Head 18]

Figure 5:
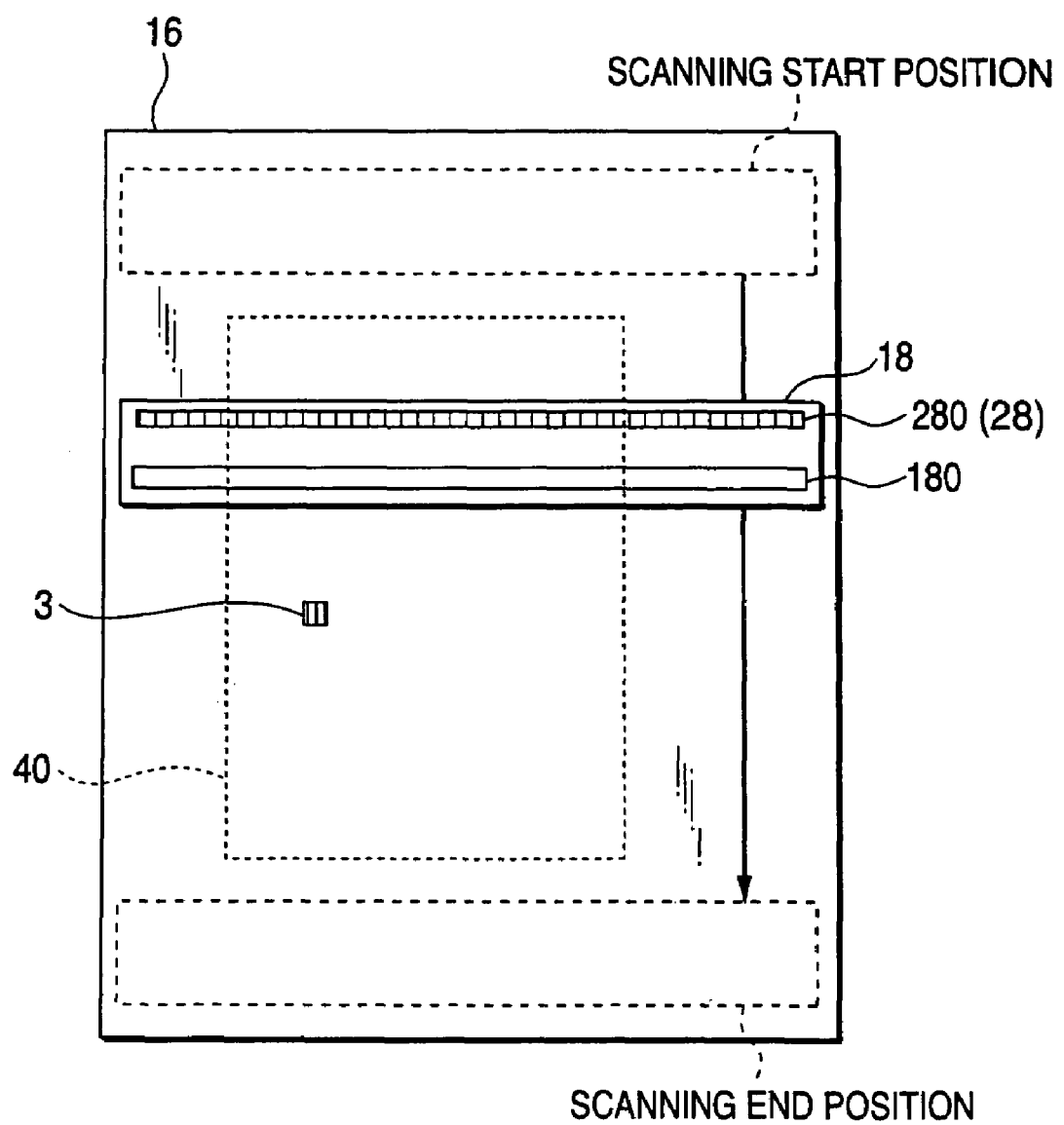
FIG. 5 is a diagram for schematically indicating a scanner in the case that the copying apparatus shown in FIG. 4 is viewed from an upper side.

FIG. 5 is a schematic diagram for showing the scanner 16 when the copying apparatus 1 shown in FIG. 4 is viewed from an upper direction.

As shown in FIG. 5, the scanner 16 includes the scanner head 18 and a head drive unit (not shown) for moving the scanner head 18.

This scanner head 18 includes an optical sensor 180 for optically reading an image of the original paper 40, an IC chip IF 28, and an antenna 280.

The IC chip IF 28 and the antenna 280 constitute an antenna array in such a manner that plural sets of the IC chip IFs and antennas are arranged along a direction, which is substantially perpendicular to the moving direction (an arrow direction) of the scanner 18 and are located on a plane, which is opposite to the original paper 40 and is also a housing surface of the scanner head 18.

In other words, the scanner head 18 may employ such a hardware structure that the IC chip IF 28 and the antenna 280 are added to a general-purpose scanner head apparatus capable of reading an original image of the original paper 40.

While the scanner 16 moves the scanner head 18 from a scanning start position to a scanning end position, the scanner makes the optical sensor 180 and the IC chip IF 28, which are disposed on the scanner head 18, read the original image of the original paper 40 and the addition information of the IC chip 3, respectively.

Also, the scanner 16 can specify a position of the IC chip 3 within the original paper 40 based upon a position of the scanner head 18 at a time of sensing the IC chip 3 and a position of the antenna 280 at the time of sensing the IC chip 3.

[IC Chip 3/IC Chip IF 28]

Figure 6:
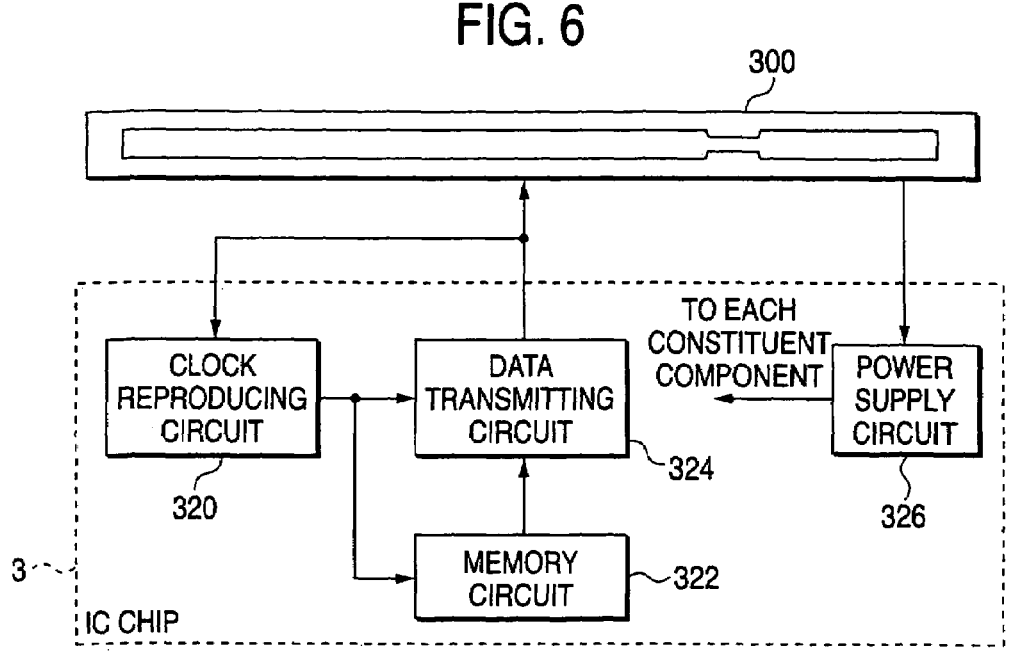
FIG. 6 is a diagram for showing a structure of the IC chip indicated in FIG. 2A.

FIG. 6 is a diagram for schematically showing a structure of the first IC chip 3 shown in FIG. 2A.

Figure 7:
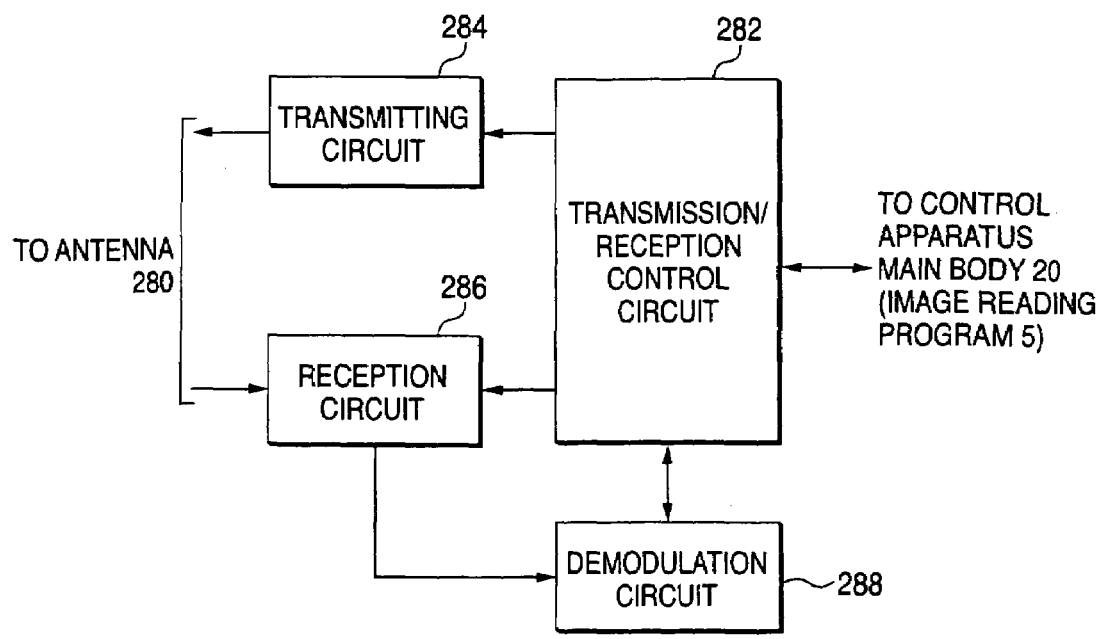
FIG. 7 is a diagram for indicating a structure of an IC chip IF shown in FIG. 1, and FIG. 5.

FIG. 7 is a diagram for schematically showing a structure of the IC chip IF 28 shown in FIGS. 1 and 5.

As shown in FIG. 6, the IC chip 3 includes an antenna 300, a clock reproducing circuit 320, a memory circuit 322, a data transmitting circuit 324, and a power supply circuit 326.

It should also be noted that when it is so guaranteed that the IC chip 3 of the original paper 40 passes through an area in close proximity to the antenna 280, an IC chip 3 having no antenna 300 may be employed.

Also, as shown in FIG. 7, the IC chip IF 28 includes a transmitting circuit 284, a receiving circuit 286, a transmission/reception control circuit 282, and, a demodulating circuit 288.

In accordance with the below-mentioned operations of the respective constituent components employed in the IC chip 3 and the IC chip IF 28, information (data), which has been stored in the IC chip 3, is read therefrom via the IC chip IF 28 in a non-contact manner.

In the IC chip 3 (see FIG. 6), the power supply circuit 326 (FIG. 6) rectifies an electromagnetic wave signal supplied via the antenna 300 to supply electric power to the respective constituent components of the IC chip 3, while this electric power is required for these constituent components.

The clock reproducing circuit 320 reproduces a clock signal from the electromagnetic wave signal supplied via the antenna 300 from the IC chip IF 28 and then, outputs this reproduced clock signal to the memory circuit 322 and the data transmitting circuit 324.

The memory circuit 322 outputs the additional information (FIG. 3) stored therein to the data transmitting circuit 324 in synchronism with a clock signal input from the clock reproducing circuit 320.

The data transmitting circuit 324 changes a reflection intensity of the electromagnetic wave signal supplied from the IC chip IF 28 in accordance with a value of the data input from the memory circuit 322 in synchronism with the clock signal input from the clock reproducing circuit 320.

Accordingly, the data indicating the information, which has been stored in the memory circuit 322, is transmitted from the IC chip 3 to the IC chip IF 28 by changing the intensity of the reflection signal of the electromagnetic wave signal transmitted from the IC chip IF 28 to the IC chip 3.

In the IC chip IF 28 (FIG. 7), the transmission/reception control circuit 282 controls operations of the respective constituent components of this IC chip IF 28.

Also, this transmission/reception control circuit 282 outputs to the control apparatus main body 20 (image reading program 5, which will be discussed later with reference to FIG. 8), data indicating the additional information (FIG. 3), which has been received by the receiving circuit 286 and then has been demodulated by the demodulating circuit 288.

The transmission circuit 284 transmits the electromagnetic wave signal containing the clock signal via the antenna 280 to the IC chip 3.

The receiving circuit 286 receives a reflection signal, which is reflected from the IC chip 3, and then outputs this received reflection signal to the demodulating circuit 288.

The modulating circuit 288 demodulates the data transmitted from the IC chip 3 based upon a change of the reflection signal input from the receiving circuit 286, and then outputs the demodulated data to the transmission/reception control circuit 282.

[Image Reading Program 5]

Figure 8:
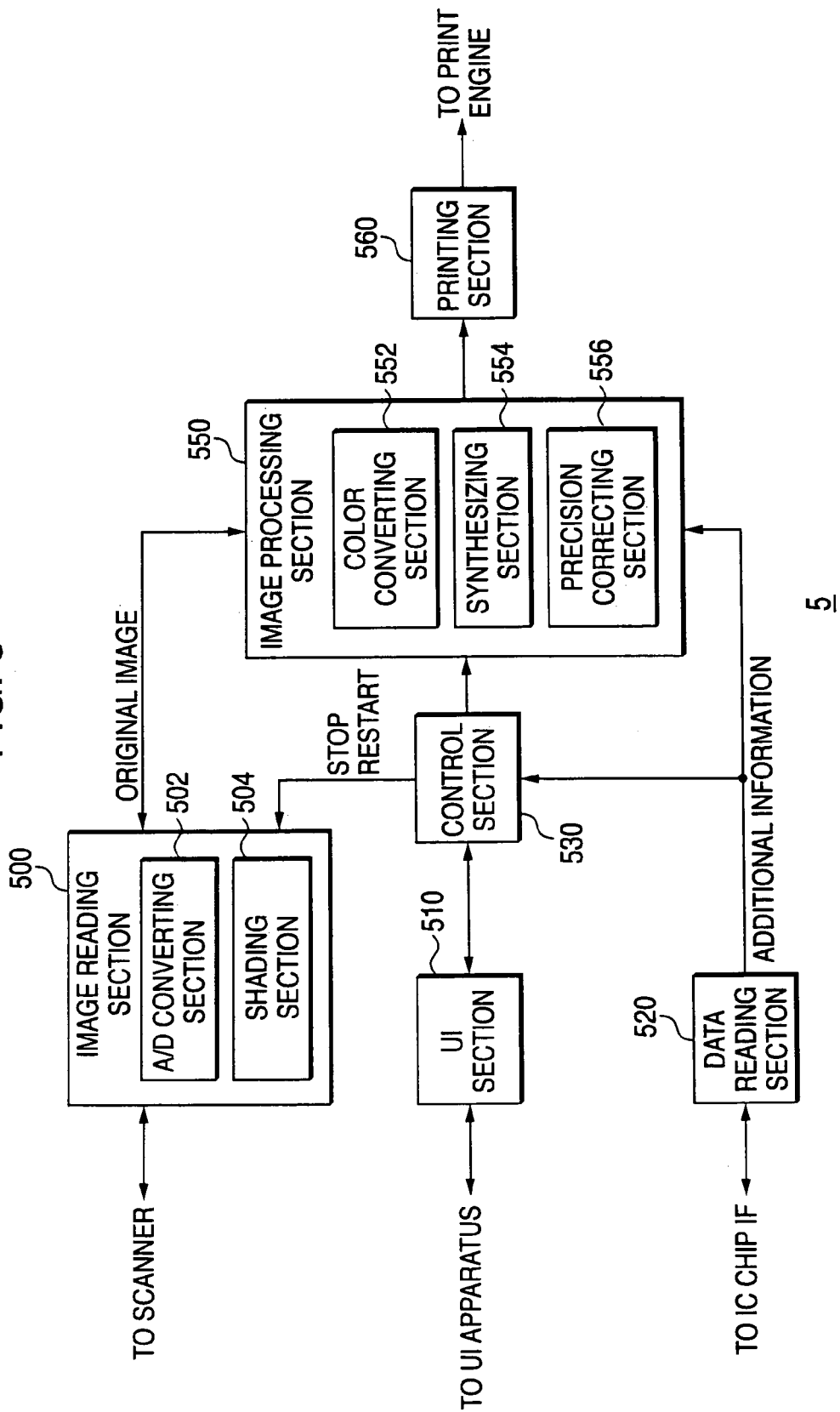
FIG. 8 is a diagram for showing a structure of an image reading program 5 which is executed by the control apparatus 2 (FIG. 1 and FIG. 4) so as to realize the image reading method according to the present invention.

FIG. 8 is a block diagram for schematically showing a structure of the image reading program 5, which is executed by the control apparatus 2 (see FIG. 1 and FIG. 4) to realize the image reading method according to the invention.

As shown in FIG. 8, the image reading program 5 includes an image reading section (image reading unit) 500, an UI section (operation unit) 510, a data reading section (data reading unit) 520, a control section (control unit) 530, an image processing section 550, and a printing section (output unit) 560.

Also, the image reading section 500 contains an A/D converting section 502 and a shading section 504. The image processing section 550 contains a color converting section 552, a synthesizing section (synthesizing unit) 554, and a precision correcting section 556.

The image reading program 5 prints the image read from the original paper 40 and the additional information read from the IC chip 3, or any one of the image and the additional information in response to a condition as to whether or not the IC chip 3 is attached thereto.

The image reading program 5 is supplied via, for instance, the recording media 240 (FIG. 1) to the control apparatus 2, and is loaded to the memory 204 so as to be executed.

In the image reading program 5, the image reading section 500 controls the constituent components of the copying apparatus main body 10 such as the scanner 16 (FIG. 4 and FIG. 5) to sequentially perform a pre-scanning operation and a main scanning operation.

In the pre-scanning operation, the image reading section 500 executes an original size sensing process operation, which can sense a dimension (size) of the original paper 40, and an original paper color sensing process operation, which can sense the color of the original paper 40 itself.

In the main scanning operation, the image reading section 500 controls the scanner 16 so as to read the original image displayed on the original paper 40 (FIG. 2).

The A/D converting section 502 quantizes an image signal read by the optical sensor (FIG. 5) to convert this analog image signal into image data, which is digital data.

The shading section 504 performs the shading correction with respect to the image data converted by the A/D converting section 502.

When it is judged that additional information contains a printable attribute, which can be printed as an image, the UI section 510 controls the UI apparatus 26 (FIGS. 1 and 4) to display selection information. This selection information prompts the user to select the additional information to be printed out.

Also, the UI section 510 receives the user operation for selecting the additional information to be printed and then, outputs output data information designating the additional information to be printed to the control section 530.

Furthermore, the UI section 510 receives another user operation designating an output format when the selected output data is output and then, outputs designation information designating the instructed output format to the control section 530.

The data reading section 520 controls the IC chip IF 28 to read data indicating the additional information (FIG. 3) from the IC chip 3, and then outputs the read data to the control section 530 and the image processing section 550.

For instance, the data reading section 520 reads the data from the IC chip 3 during the pre-scanning operation, which is performed in higher speed than that of the main scanning operation in order to judge as to whether or not the IC chip 3 is present.

The control section 530 judges the attribute of the additional information input from the data reading section 520.

When the attribute of the additional information corresponds to the printable attribute (namely, either image data or text data), the control section 530 controls the image reading section 500 to stop the image reading process operation (namely, main scanning operation), whereas in other cases, the control section 530 allows the image reading process operation.

When the output data information and the designation information are input from the UI section 510 to the control section 530, the control section 530 controls the image processing section 550 to print out the additional information designated by the output data information and the read original image in the output format designated by the designation information.

When the output data information designating to print the original image is input from the UI section 510 after the reading process operation of the original image has been stopped, the control section 530 controls the image reading section 500 to restart the image reading process operation, so that the original image is read from the original paper 40.

In the image processing section 550, the color converting section 552 converts R, G, B signals of the image input from the image reading section 500 into signals (Lab or the like), which are defined in the standardized color space.

When the output format in which an original image is synthesized with additional information to print the synthesized one is designated, the synthesizing section 554 synthesizes the original image converted by the color converting section 552 with the additional information input from the data reading section 520.

The precision correcting section 556 adjusts a sharpness of the image synthesized by the synthesizing section 554.

Finally, the color converting section 552 converts the image data, which has been adjusted by the precision correcting section 556, into Y, M, C, K color signals and outputs the Y, M, C, K color signals to the printing section 560.

The printing section 560 controls the print engine 4 (FIG. 4) to print the image data input from the image processing section 550 on the printing paper 42 (FIG. 2B) in the output format designated by the designation information.

[Overall Operation]

Next, overall operation of the copying apparatus will be described.

Figure 9:
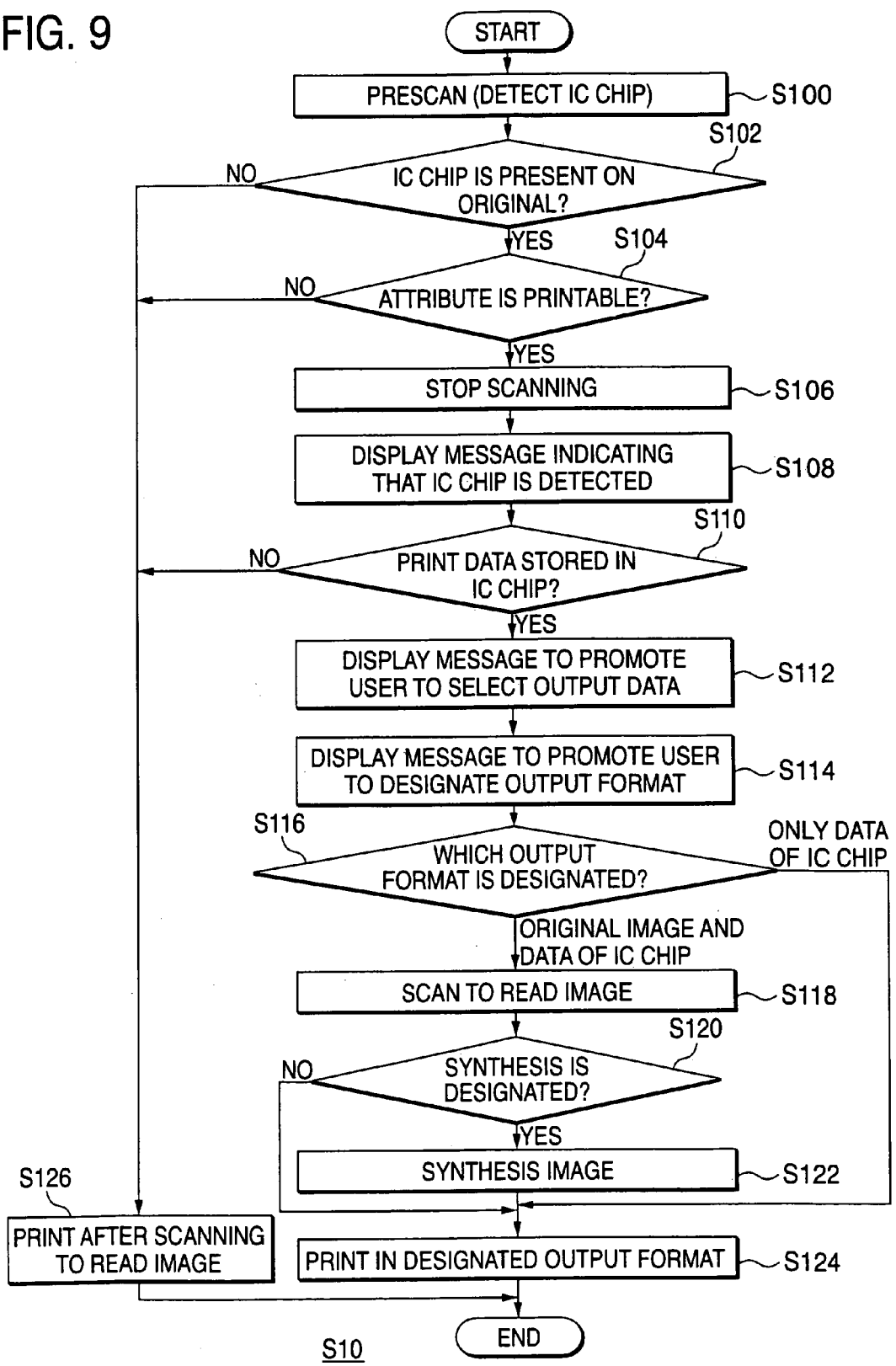
FIG. 9 is a flow chart for indicating a first operation (step S10) of the copying apparatus (image reading program 5).

FIG. 9 is a flow chart for describing a first operation (S10) of the copying apparatus 1 (the image reading program 5).

Figure 10:
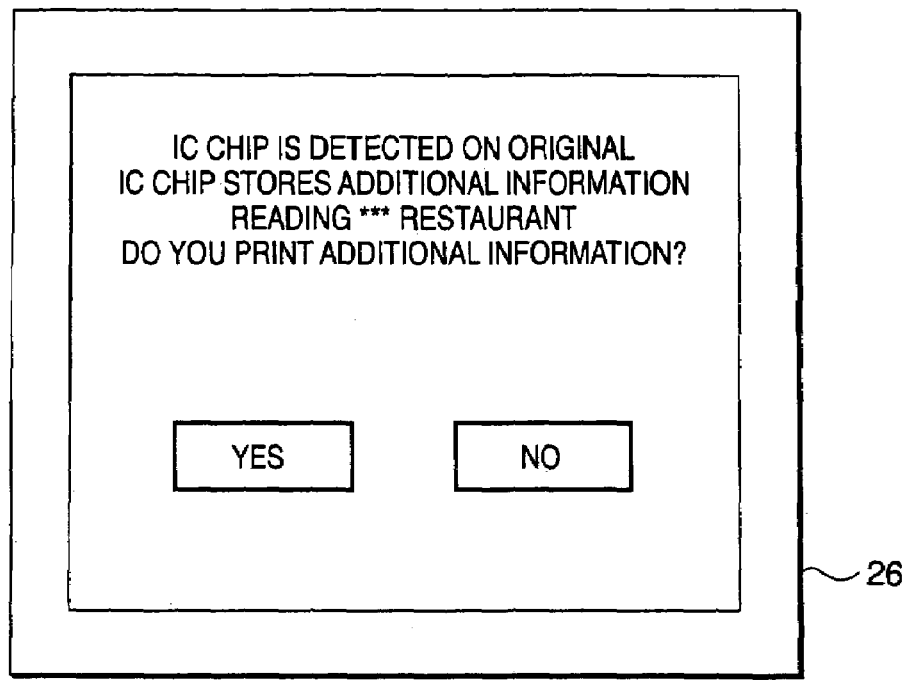
FIG. 10 is a diagram for exemplifying a screen displayed by the UI apparatus (FIG. 1 and FIG. 4) in a process operation defined in a step 108 (S108) of the flow chart shown in FIG. 9.

FIG. 10 is a diagram for showing a display screen displayed by the UI apparatus 26 (FIGS. 1 and 2) in a process operation of a step 108 (S108) in the flow chart shown in FIG. 9.

Figure 11:
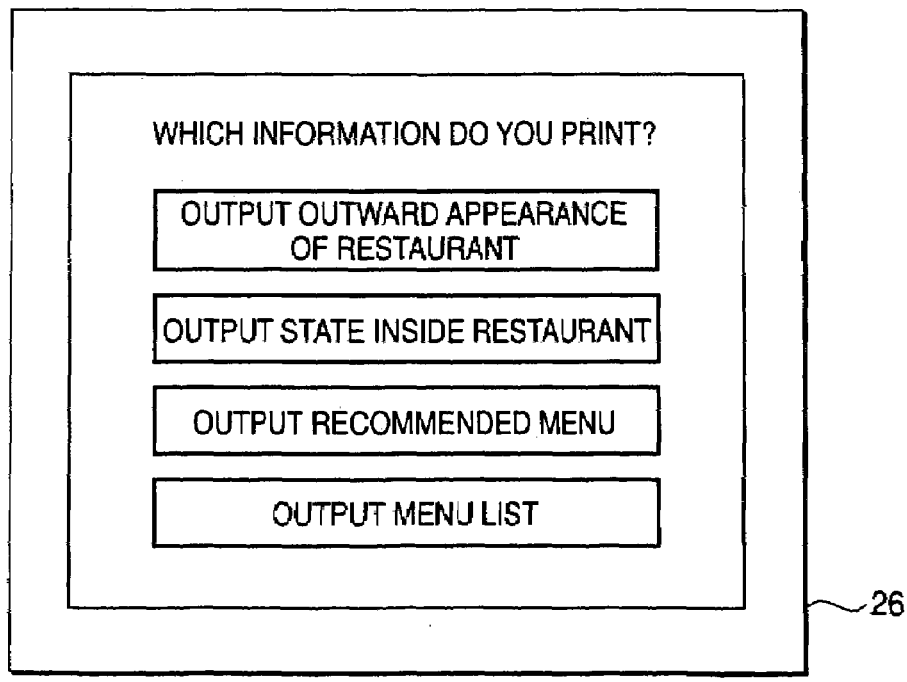
FIG. 11 is a diagram for exemplifying a screen for displaying selection information by the UI apparatus (FIG. 1 and FIG. 4) in a process operation defined in a step 112 (S112) of the flow chart shown in FIG. 9.

FIG. 11 is a diagram for showing a display screen on which the UI apparatus 26 displays the selection information in a process operation of a step 112 (S112) in the flow chart shown in FIG. 9.

Figure 12:
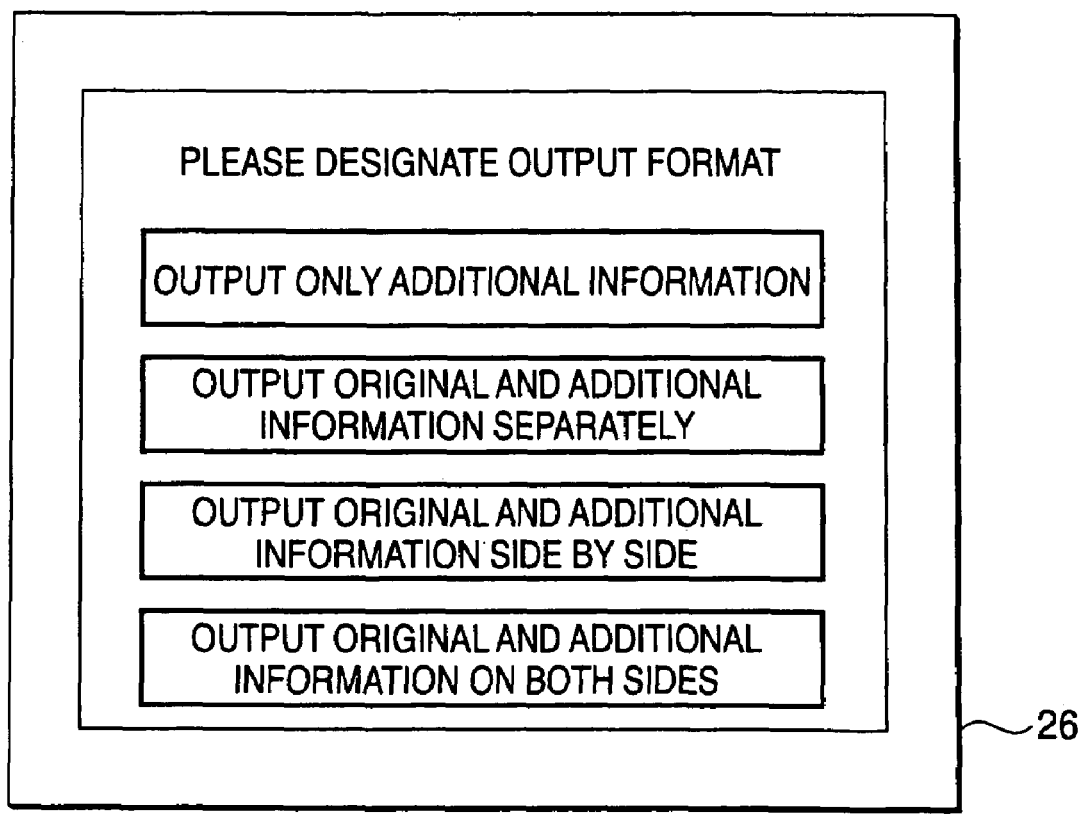
FIG. 12 is a diagram for exemplifying a screen for prompting a designation of an output format by the UI apparatus (FIG. 1 and FIG. 4) in a process operation defined in a step 114. (S114) of the flow chart shown in FIG. 9.

FIG. 12 is a diagram for showing a display screen, which the UI apparatus 26 displays to prompt the user to designate an output format in a process operation of a step 114 (S114) in the flow chart shown in FIG. 9.

As shown in FIG. 9, when a copying process operation receives an instruction by the user in a step 100 (S100), the image reading section 500 (FIG. 8) controls the scanner (FIGS. 4 and 5) 16 and the like so as to execute the pre-scanning operation with respect to the original paper 40.

At the same time, the data reading section 520 controls the IC chip IF 28 (FIGS. 1 and 5) to read data from the IC chip 3.

When the data is read from the IC chip 3 in the step 102 (S102), the image reading program 5 is advanced to a process operation of in a step S104, whereas in other cases, the image reading program 5 is advanced to another process operation of a step S126.

In the step 104 (S104), the control section 530 (FIG. 8) uses the attribute data (FIG. 3) read from the IC chip 3 to judge as to whether or not additional information has an attribute, which can be printed as an image.

When the read data has the printable attribute, the image reading program 5 is advanced to a process operation of a step S106, whereas in other cases, the image reading program 5 is advanced to another process operation of a step S126.

In a step 106 (S106), the control section 530 controls the image reading section 500 to prohibit the main scanning operation when the scanner head (FIG. 5) 18 is returned to a scanning start position after the pre-scanning operation, and to stop the reading process operation of the image.

In a step 108 (S108), the UI section 510 (FIG. 8) controls the UI apparatus 26 (FIGS. 1 and 4) to display a message that the printable additional information is contained in the data, which is read from the IC chip 3 as shown in FIG. 10.

In a step 110 (S110), the UI section 510 receives a user operation for instructing as to whether or not the additional information is printed via the UI apparatus 26.

If "YES" on the touch panel of the UI apparatus 26 shown in FIG. 10 is touched by the user (namely, when user instructs to print additional information), the image reading program 5 is advanced to a process operation of a step S112, whereas in other cases, this image reading program 5 is advanced to another process operation of a step S126.

In the step 112 (S112), the UI section 510 (FIG. 8) controls the UI apparatus 26 (FIGS. 1 and 4) to display the selection information as shown in FIG. 11. This selection information prompts the user to select the additional information to be printed.

When the user touches a display position of the additional information, which is desired to be printed, on the touch panel of the UI apparatus 26 shown in FIG. 11, the UI section 510 outputs the output data information corresponding to the touched display position to the control section 530. This display position of the additional information maybe, for example, a position where "to output outward appearance of restaurant" is displayed or another position where "to output internal state of restaurant" is displayed.

In a step 114 (S114), the UI section 510 controls the UI apparatus 26 (FIGS. 3 and 4) to display information designating the output format when an image is printed as shown in FIG. 12.

In a step 116 (S116), when the user touches a display position of a desirable output format on the touch panel of the UI apparatus 26 as shown in FIG. 12, the UI section 510 outputs the designation information corresponding to the touched display position to the control section 530. This display position of the desirable output format may be, for example, a position where "only additional information is output" is displayed or a position where "original and additional information are output in a separate manner" is displayed.

When the display position of "only additional information is output" is touched (namely, when the designation information is input to designate to print only the additional information read from IC chip 3) on the touch panel of the UI apparatus 26 shown in FIG. 12 is touched by the user, the image reading program 5 is advanced to a process operation of a step S124. On the other hand, when a display position where "original and additional information are separately output", "original and additional information are output side by side", or "original and additional information are output on both planes" is displayed is touched by the user (namely, when a designation information designating to print both original image and additional information is input), the image reading program 5 is advanced to a process operation of a step S118.

In the step 118 (S118), the control section 530 (FIG. 8) allows the image reading section 500 to perform the main scanning operation and to restart the image reading operation.

The image reading section 500 controls the scanner 16 (FIGS. 4 and 5) in response to the permission of the main scanning operation to read the original image (FIG. 2A) displayed on the original paper 40.

In a step 120 (step S120), when an output mode is designated in which the original image is synthesized with the additional information to print the synthesized image/information, the image reading program 5 is advanced to a process operation of a step S122, whereas in other cases, this image reading program 5 is advanced to another process operation of a step S124.

In the step 122 (S122), the synthesizing section 554 (FIG. 8) synthesizes the image data, which has been converted into the Lab signal, with the data of the additional information (namely, font data correspond to either image data or text data).

In a step 124 (S124), the printing section 560 (FIG. 8) controls the print engine 14 (FIG. 4) to print the image data, which have been converted into the YMCK color signals, in the designated output format.

For instance, when "original and additional information are separately output" as shown in FIG. 12 is instructed, the printing section 560 prints both the image data of the original image and the additional information (either image or text image) on the printing paper 42-1 and the printing paper 42-2, respectively, as shown in FIG. 2B.

In a step 126 (S126), the control section 530 controls the image reading section 500 to perform the main scanning operation just after the pre-scanning operation has been completed, to read the original image.

The printing section 560 prints the read original paper on the printing paper 42.

In other words, the original reading program 5 executes the normal copying process operation both in the case that the IC chip 3 is not detected from the original paper 40 and in the case that the additional information having the attribute, which can be printed as the image, is not read.

Also, when the user does not select to print the additional information, the image reading program 5 reads the original image and then directly prints the read original image on the printing paper 42.

Figure 13A:
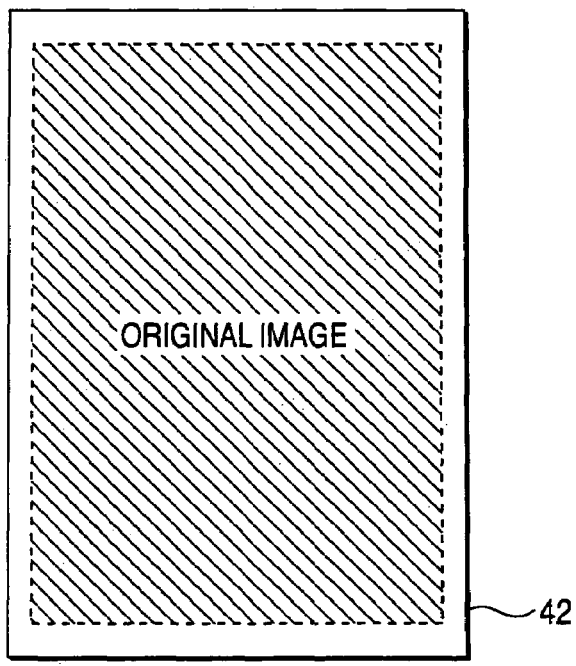
FIG. 13A is a diagram for exemplifying a front plane of a printing paper printed by the copying apparatus in the case that "both original and additional information are output on both planes" shown in FIG. 12 is designated.
Figure 13B:
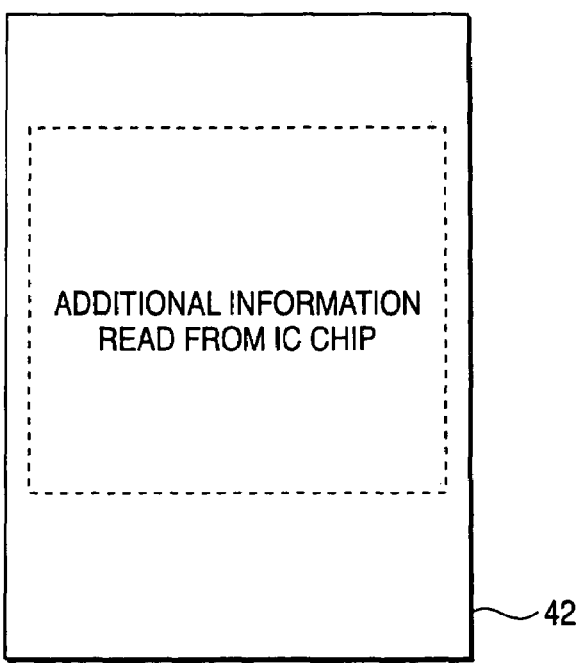
FIG. 13B is a diagram for exemplifying a rear plane of the printing paper printed by the copying apparatus.

FIG. 13A shows an example of a front plane of the printing paper 42 printed by the copying apparatus 1 (FIGS. 1 and 4) when "both original and additional information are output on both planes" shown in FIG. 12 is designated as the output format. FIG. 13B shows an example of a rear plane of the printing paper 42 printed by the copying apparatus 1.

When the display position of "both original and additional information are output on both planes" is touched in the process operation of the step S116 of the first operation (S10) shown in FIG. 12, the printing section 560 (FIG. 8) controls the print engine 14 (FIG. 4) to print the original image on the front plane of the printing paper 42 and print the additional information on the rear plane of this printing paper 42 as shown in FIG. 13A and FIG. 13B in the process operation of the step S124.

Figure 14:
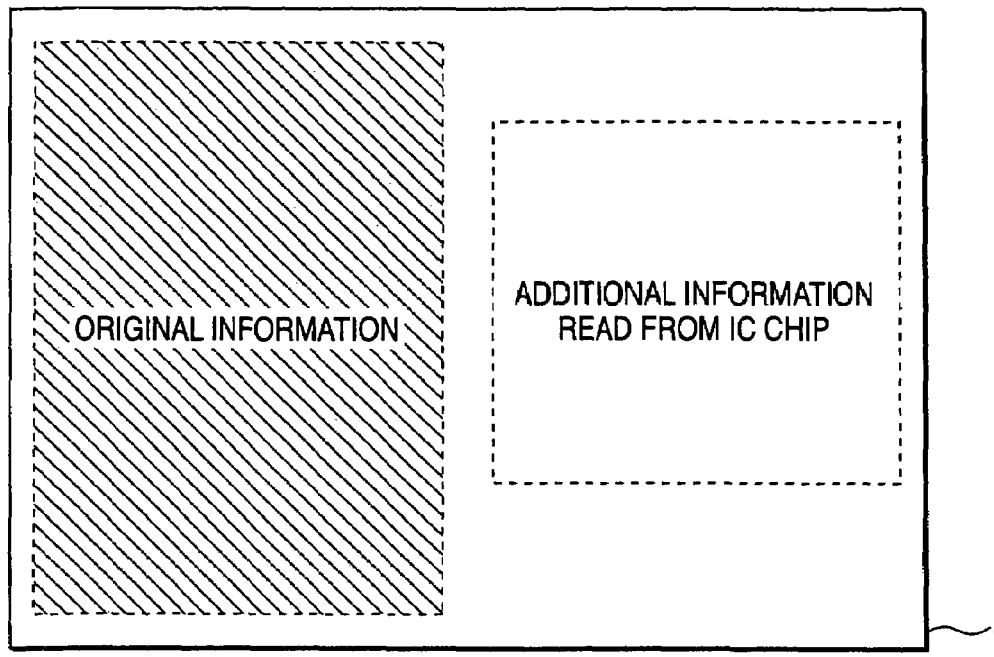
FIG. 14 is a diagram for exemplifying a printing paper printed by the copying apparatus in the case that "both original and additional information are output side by side shown in FIG. 12 is designated.

FIG. 14 shows a front plane of the printing paper 42 printed by the copying apparatus 1 when that "both original and additional information are output side by side" shown in FIG. 12 is designated as the output format.

When the display position of "both original and additional information are output side by side" is touched in the process operation of the step S116 of the first operation (S10) shown in FIG. 12, the synthesizing section 554 (FIG. 8) synthesizes the read original image with the additional information so that both the read original image and the additional information can be printed side by side in a process operation defined in a step S122.

The printing section 560 controls the print engine 14 (FIG. 4) to print the original image and the additional information on the single plane of the printing paper 42 side by side, as shown in FIG. 14.

Accordingly, the copying apparatus 1 senses the IC chip, and stops the copying process operation once when the additional information printable as the image is read. Thus, the copying apparatus 1 can notify a message that the printable additional information is present to the user.

Also, the copying apparatus 1 can print the additional information, which is selected by the user in the output mode designated by the user.

[Modification]

Figure 15A:
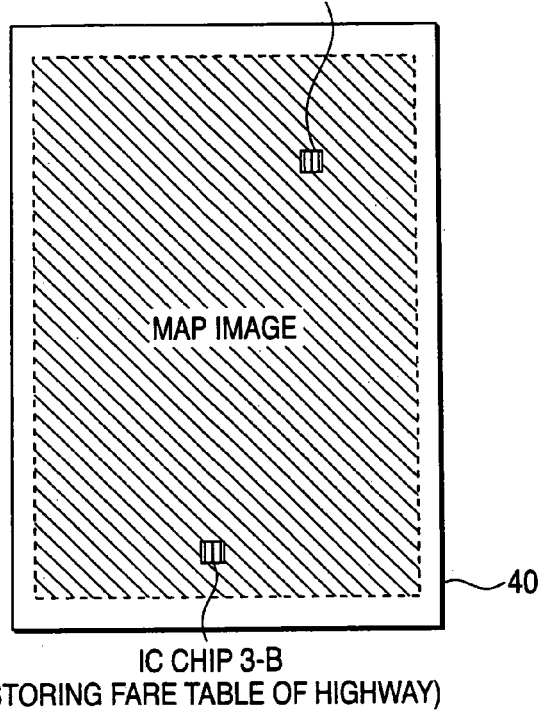
FIG. 15A is a diagram for exemplifying an original paper in which an IC chip has been attached to a position in response to a content of an original image.
Figure 15B:
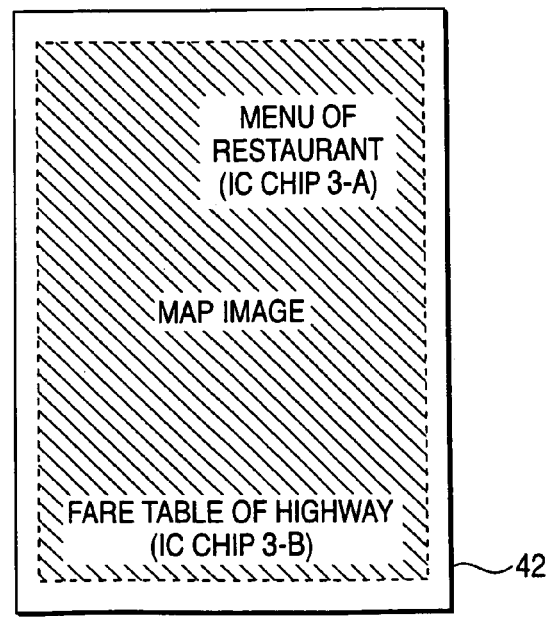
FIG. 15B is a diagram for exemplifying a printing paper which is printed based upon the original paper shown in FIG. 15A.

FIG. 15A shows an example of an original paper 40 to which the IC chip 3 is attached at a position corresponding to an original image. FIG. 15B shows an example of a printing paper 42, which is printed based upon the original paper 40 shown in FIG. 15A.

As shown in FIG. 15A, while the original image is displayed on the original paper 40, the IC chip 3 is attached to a position where additional information is required in response to the content of the original image.

For instance, while the original paper 40 displays thereon a map image, an IC chip 3-A is attached to a position of a restaurant on this map, whereas another IC chip 3-B is attached to a position of an entrance of a highway.

A menu of the restaurant has been stored as additional information into the IC chip 3-A, whereas a fare table of the highway has been stored as additional information into the IC chip 3-B.

A second operation in the modification will now be described with reference to FIG. 9.

In the second operation of the copying apparatus 1 (FIGS. 1 and 4), in the process operation of the step S100, when the original paper 40 is set to the copying apparatus 1 and then a copy processing operation is designated, the data reading section 520 (FIG. 8) reads the additional information from the IC chip 3-A and the IC chip 3-B, and furthermore, senses both the position of the IC chip 3-A and the position of the IC chip 3-B in the pre-scanning operation.

When the output format for printing both the original image and the additional information in the overlap manner is designated in the process operation of a step S116, the control section 530 (FIG. 8) controls the synthesizing section 554 synthesizes the map image, the image of the menu, and the image of the fare table with each other so that both the menu and the fare table of the highway are overlapped on the position of the restaurant (the position of the IC chip 3-A) of the map image and the position of the highway (the position of the IC chip 3-B) in the process operation of the step S122.

In the step S124, the printing section 560 controls the print engine 14 (FIG. 4) to print the synthesized image on the printing paper 42 as shown in FIG. 15B.

Accordingly, an operation that the position of the IC chip 3, which has stored the additional information thereinto, is associated with the position where the additional information read from this IC chip 3 is printed is suitable for a case that a user desires to previously designate a position where the additional information in response to a content of an original image, and the like.

Also, in this embodiment, the description has been made that the copying apparatus 1 (FIG. 1 and FIG. 4) prints both the original image and the additional information on the printing paper 42 to output these original image/additional information. Alternatively, both the original image and the additional information, or any one of these original image/additional information may be output by way of the display screen of the UI apparatus 26 (FIG. 1 and FIG. 4), or a FAX transmission mode via the communication apparatus 22 (FIG. 1), or an image data transmission mode via the communication apparatus 22.

Alternatively, the copying apparatus 1 may control the recording apparatus 24 (FIG. 1) to store both the original image and the additional information, or any one of these original image/additional information into removable media such as a flexible disk.

As described above in detail, in accordance with the image reading system and the image reading method of the invention, when the detection is made as to whether or not the semiconductor chip into which the additional information and the like have been stored, and then the semiconductor chip is detected, this fact can be recognized with respect to the user.

What is claimed is:

1. An image reading apparatus comprising:
an image reading unit that reads an original image from an original paper;
a data reading unit that reads a plurality of additional image information data stored in a non-contact memory attached to the original paper;
an output unit that outputs at least one of the original image read by the image reading unit and the additional image information data read by the data reading unit; and
a control unit that stops at least one of reading processing of the image reading unit and output processing of the output unit, in case that the additional image information data, which was read by the data reading unit, has a printable attribute, and displays, on a user interface, selection information that encourages an operation for selecting the plurality of additional image information data read by the data reading unit and an output format, wherein
the control unit, when it receives an additional image information data selection instruction and a selection instruction of the output format based on the displayed selection information, resumes the stopped processing, and outputs the additional image information data for which the selection was instructed and the original image read by the image reading unit based on the output format for which the selection was instructed, through the use of the output unit.

2. The image reading apparatus according to claim 1, wherein:

when the predetermined data has been read, the control unit controls the output unit to output at least one of the read image and the read predetermined data in response to the read predetermined data; and when the predetermined data has not been read, the control unit controls the output unit to output the read image.

3. The image reading apparatus according to claim 2, wherein:

the control unit judges an attribute of the read predetermined data on the basis of attribute data contained in the read predetermined data; and the control unit controls at least one of the image reading unit and the output unit in response to whether or not the judged attribute is an attribute indicating data, which is printable as an image.

4. The image reading apparatus according to claim 3, further comprising:

an operation unit for promoting a user to select at least one of the read image and the read predetermined data as output data to be output, when the judged attribute is the attribute indicating the printable data as an image, wherein:

when the judged attribute is the attribute, which is printable as an image, the control unit controls the image reading unit to stop reading the displayed image.

5. The image reading apparatus according to claim 4, wherein:

the operation unit receives an operation for selecting the output data; and when the output data is selected, the control unit controls the image reading unit to restart reading the displayed image and controls the output unit to output the selected output data.

6. The image reading apparatus according to claim 5, wherein:

the operation unit further receives another operation for designating an output format at a time of outputting the output data; and the control unit controls the output unit to output the selected output data in the designated output format.

7. The image reading apparatus according to claim 6, wherein:

when the read image and the read predetermined data are selected as the output data, the control unit controls the output unit to print the read image and the read data on different image formation media in accordance with the designated output format, respectively.

8. The image reading apparatus according to claim 6, wherein:

when the read image and the read predetermined data are selected as the output data, the control unit controls the output unit to print the read image and the read predetermined data on both surfaces of an image formation medium in accordance with the designated output format, respectively.

9. The image reading apparatus according to claim 6, further comprising:

a synthesizing unit for synthesizing the read image with the read predetermined data in accordance with the designated output format, wherein:

when the read image and the read predetermined data are selected as the output data, the control unit controls the output unit to output the synthesized data in accordance with the designated output format.

10. The image reading apparatus according to claim 9, wherein:

the synthesizing unit synthesizes the read image with the read predetermined data in accordance with the designated output format so that the read image and an image indicated by the read predetermined image are displayed in a superimposed manner.

11. The image reading apparatus according to claim 9, wherein:

the synthesizing unit synthesizes the read image with the read predetermined data in accordance with the designated output format so that the read image and an image indicated by the read predetermined image are displayed side by side.

12. An image reading apparatus comprising:

an image reading unit that reads an original image from an original paper;

a data reading unit that reads a plurality of additional image information data stored in a non-contact memory attached to the original paper;

an output unit that outputs at least one of the original images read by the image reading unit and the additional image information data read by the data reading unit; and a control unit that stops at least one of reading processing of the image reading unit and output processing of the output unit, in case that the additional image information data, which was read by the data reading unit, has a printable attribute, and displays, on a user interface, selection information that encourages an operation for selecting the plurality of additional image information data read by the data reading unit, wherein the control unit, when it receives an additional image information data selection instruction based on the displayed selection information, resumes the stopped processing, and outputs the additional image information data for which the selection was instructed and the original image read by the image reading unit through the use of the output unit.

* * * * *